Jan. 3, 1950     W. NELSON     2,493,014
LIQUID TURBINE AIRPLANE CATAPULT
Filed Sept. 18, 1940     4 Sheets-Sheet 1
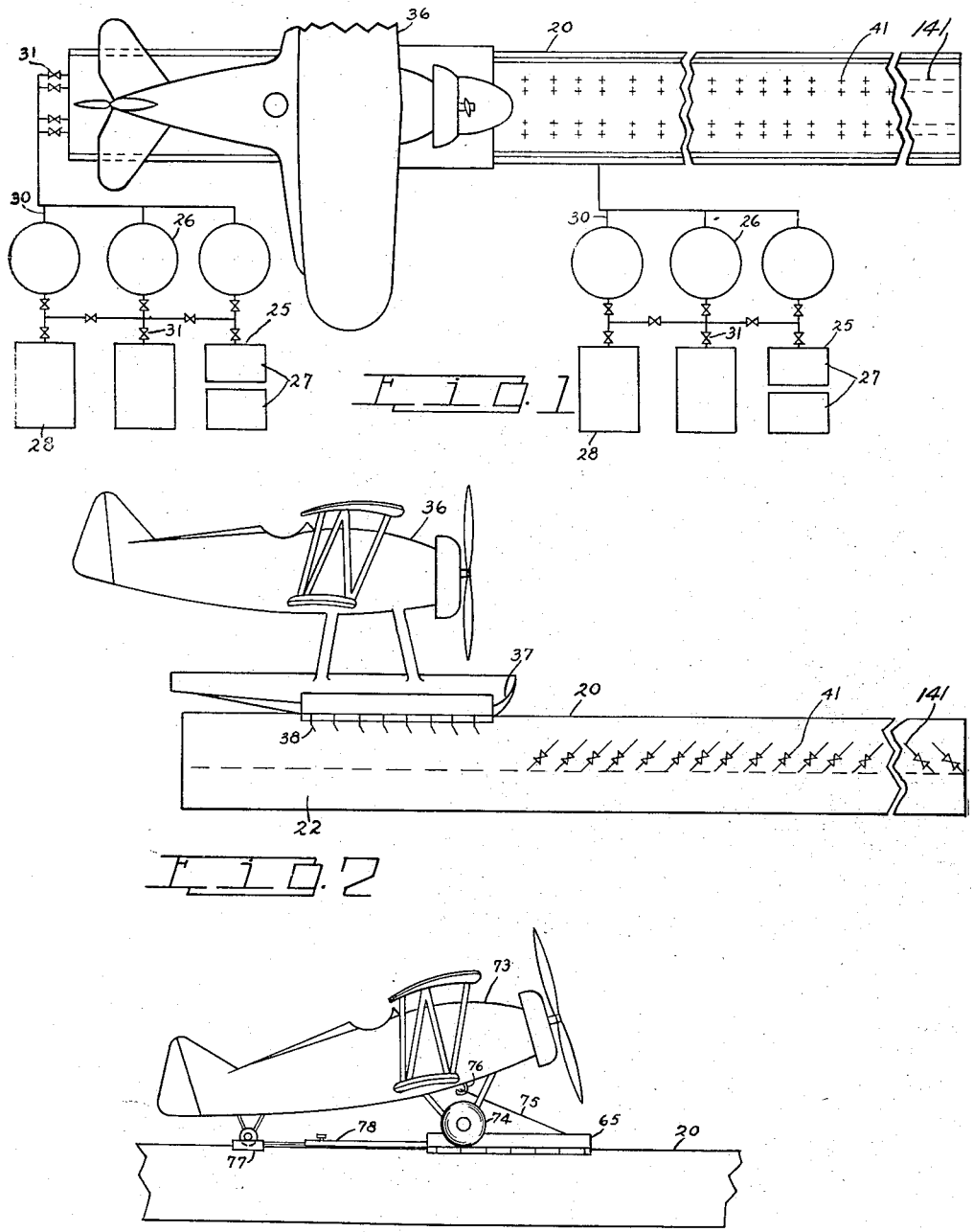
INVENTOR
WILLIAM NELSON
BY
ATTORNEY

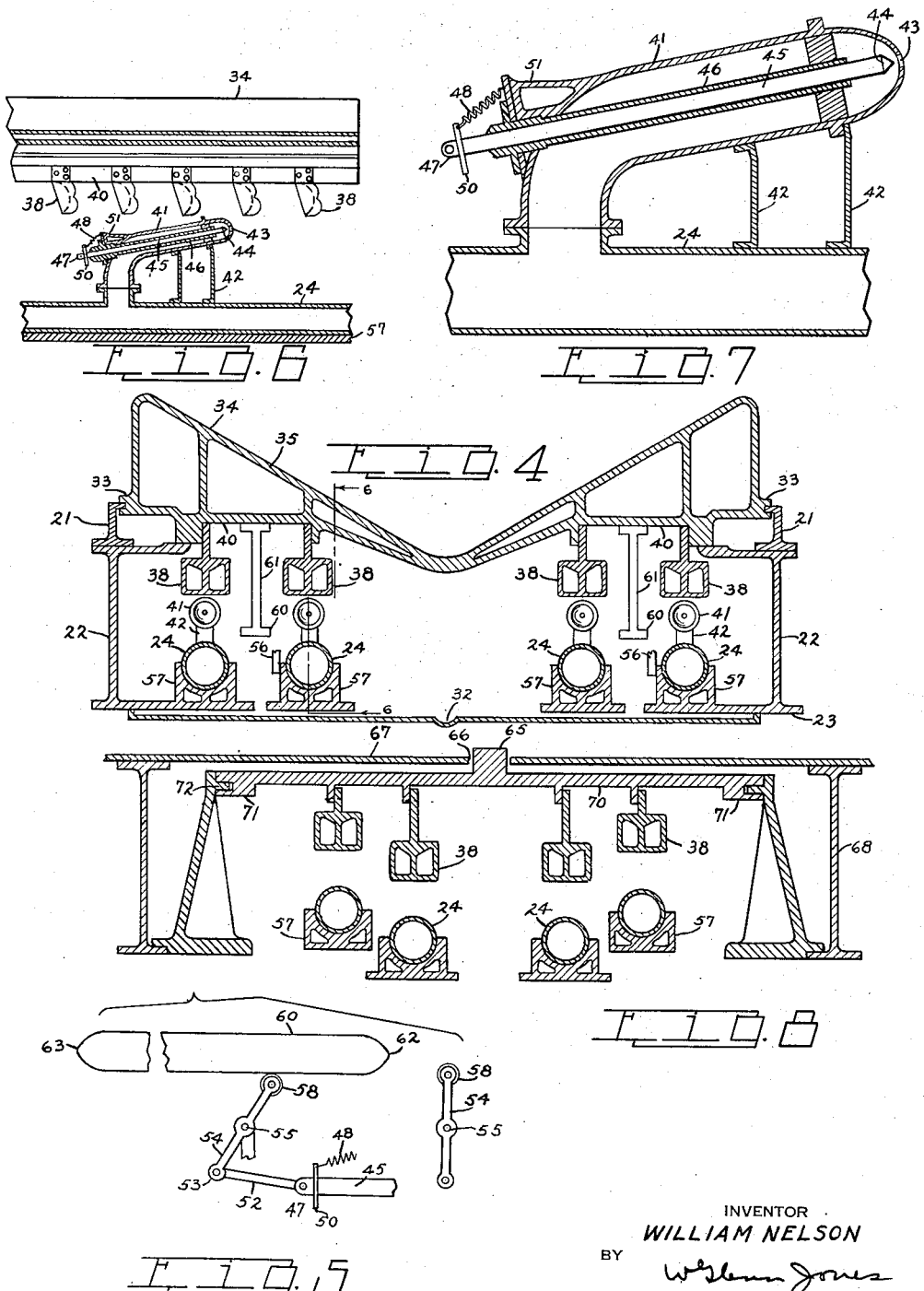

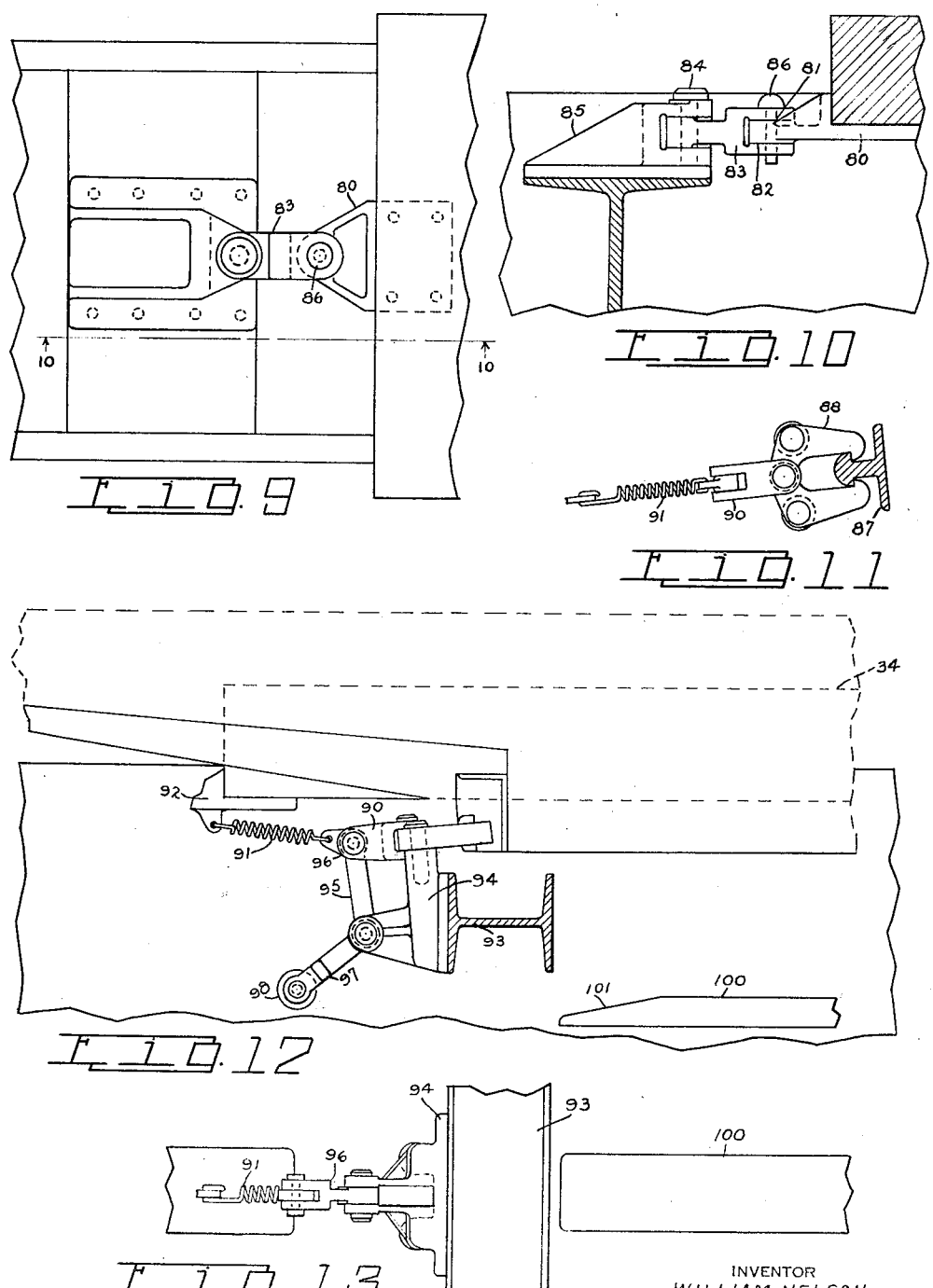

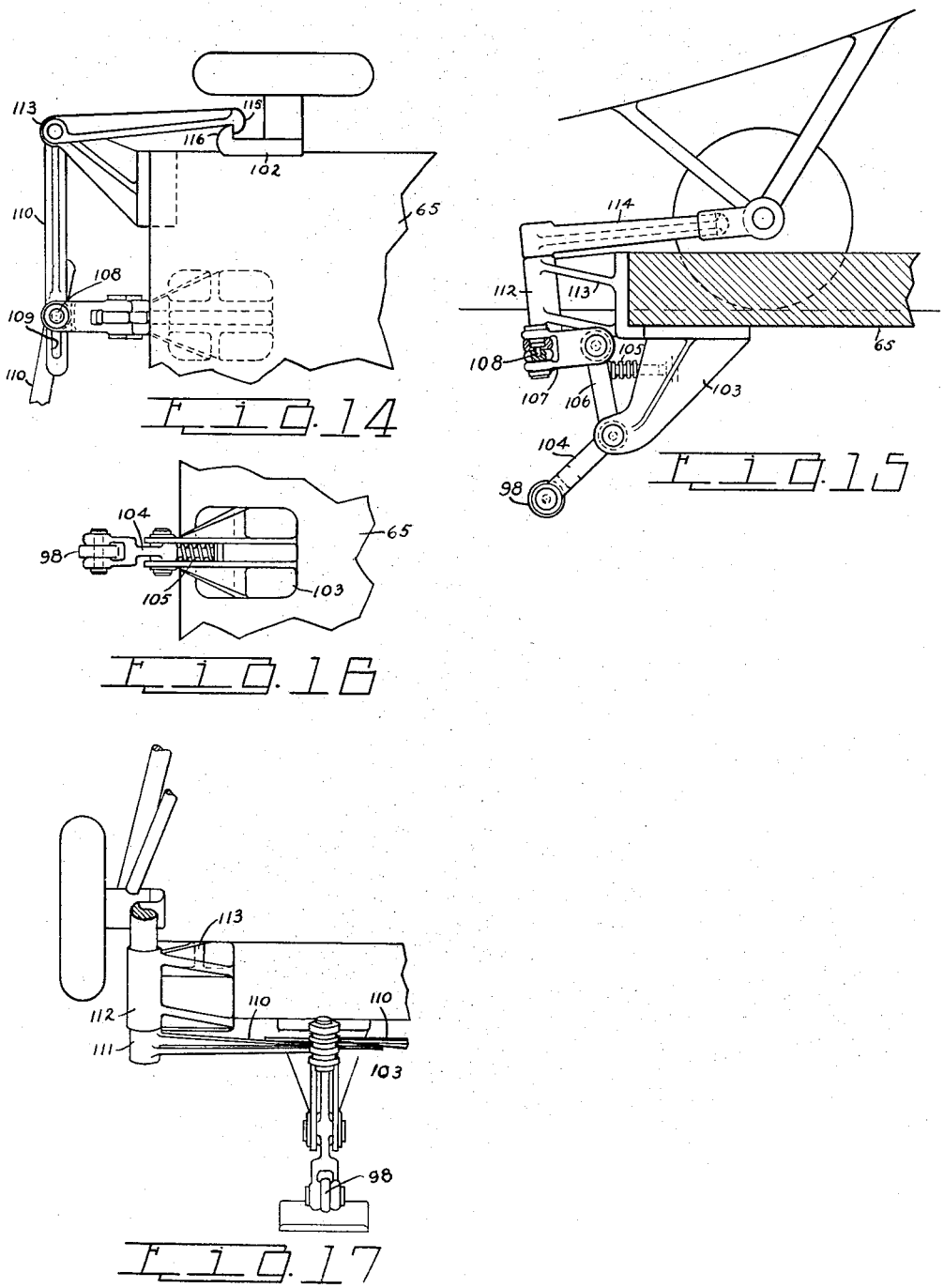

Patented Jan. 3, 1950

2,493,014

UNITED STATES PATENT OFFICE 2,493,014

LIQUID TURBINE AIRPLANE CATAPULT

William Nelson, United States Navy

Application September 18, 1940, Serial No. 357,259

5 Claims. (Cl. 244—63)

(Granted under the act of March 3, 1883, as amended April 30, 1928; 370 O. G. 757)

This invention relates to a liquid turbine airplane catapult, and has for an object to provide an airplane catapult power actuated by a liquid turbine rather than through heavy cables.

A further object of this invention is to provide an airplane catapult wherein the catapult car or shuttle is actuated by a liquid turbine arrangement, thereby eliminating the lengthy cables and heavy moving parts prevalent in many existing types of catapults.

A further object of this invention is to provide an airplane catapult wherein the energy is transmitted by means of liquid jets impinging on buckets mounted on the car or shuttle under high pressure, the pressure being transmitted to the fluid by compressed air, gas, or high pressure steam.

Still a further object of this invention is to provide a cataput wherein the source of power may be located either at the end of the runway or may be distributed at several points along the runway, enabling various amounts of power to be applied as desired along various portions of the runway.

A further object of this invention is to provide a source of power which, when transmitted to the car or shuttle, not only provides longitudinal movement thereto, but also has an upward component or force tending to lift the car or shuttle together with the supporting aircraft thereon, thereby reducing the weight and thus the friction of the car or shuttle on its track.

A further object of this invention is to provide an airplane catapult operated by a longitudinal liquid turbine.

A further object of this invention is to provide a means of holding the car or shuttle against movement until the power exceeds a predetermined amount.

Still a further object of this invention is to provide a means of securing the aircraft against leaving the car or shuttle until the car or shuttle has reached a predetermined point on the runway at which it will have already reached flying speed.

With the foregoing and other objects in view, the invention consists in the construction, combination and arrangement of parts hereinafter described and illustrated in the drawings, in which:

Fig. 1 is a top plan view partly broken away showing a layout of the airplane catapult and runway of this invention;

Fig. 2 is a fragmentary side view of Fig. 1, showing a seaplane on the catapult car;

Fig. 3 is a view similar to Fig. 2, showing a land plane towed by a shuttle over the runway;

Fig. 4 is a sectional view through the runway, showing the car track arrangement;

Fig. 5 is a detail plan view of the turbine jet and of the car cam actuation for opening the jet;

Fig. 6 is a section on line 6—6 of Fig. 4;

Fig. 7 is an enlarged detail of the nozzle in Fig. 6;

Fig. 8 is a view similar to Fig. 4 of a section through a land plane towing shuttle;

Fig. 9 is a plan view of the car or shuttle holding and releasing mechanism;

Fig. 10 is a sectional view on line 10—10 of Fig. 9;

Fig. 11 is a plan view of the details of a device for holding and releasing a seaplane from the car;

Figs. 12 and 13 are side and bottom views of the device of Fig. 11;

Fig. 14 is a fragmentary plan view of a device for holding and releasing a land plane to its towing shuttle; and Figs. 15, 16 and 17 are side, bottom, and rear views of the device of Fig. 14.

There is shown at 20 a layout of the catapult of this invention. This layout 20 includes the tracks 21 supported on the side frames 22 which extend upwardly from bases 23. The tracks 21 may be supported at, above or below the ground surface or deck surface of a ship, as desired, the surface being trenched if the tracks 21 are to be supported therebelow. Extending along between the side frames 22 are the pipe lines 24, four of such lines 24 being here shown, but it is understood that a greater or lesser number may be provided, as desired. Each of these pipe lines 24 is connected at one or more positions about one or more power arrangements generally shown at 25. Each power arrangement includes a set of accumulators 26 for holding fluid accumulated therein by means of pumps 27 and provided with gas pressure by means of compressors or steam generators 28, it being understood that either compressed air, gas or high pressure steam may be provided. Suitable connecting lines 30 between the details of the power arrangements and the pipe lines are provided, and are supplied with suitable cutoff valves 31 located as desired, for cutting in and out any individual detail thereof.

Below the pipe lines 24 a suitable drain trough 32 may be provided for collecting the waste liquid and discharging it or returning it, as desired, by the pumps 27 to the accumulators 26. Movable over the tracks 21 and supported by slippers 33 is the car 34, here shown as having a V-shaped bed 35 for carrying a seaplane 36 and cooperating with the pontoon 37 thereof. Depending from the bottom of the car 34 is a plurality of series of buckets 38 secured to the car bottom 40 at a slight angle, as shown, there being one longitudinal series of buckets 38 for each pipe line 24, and hence there are four series of buckets shown corresponding to the four pipe lines in Fig. 4.

As will be seen, each bucket 38 when impinged by a jet of liquid at right angles to the plane of the bucket provides a longitudinal moment of force on the car structure and a slight vertical moment of force, thus providing transitory motion to the car, while at the same time providing a slight lift thereto, thereby reducing the weight and friction of the car as its slippers 33 move over the track 21.

Extending along the top of each pipe line 24 is a series of jet nozzles 41, each nozzle 41 being supported at a slight angle by means of legs 42 welded or otherwise secured to the tops of the pipes 24. Each jet nozzle 41 has its jet opening 43 just below the path of movement of the series of car buckets 38. This jet opening 43 is closed by a valve 44 formed on the end of a valve stem 45 extending through the nozzle 41. This valve stem 45 extends through a sleeve 46 extending from the rear of the nozzle 41 and terminates in an eye 47 externally thereof. A coil spring 48 secured to a collar 50 and anchored to an external rib 51 of the nozzle 41 normally holds the valve 44 in closed position in the jet opening 43, assisted by the pressure in the pipe lines 24. A cable or link 52 connects the eye 47 of valve stem 45 to an eye 53 formed on one end of a lever 54 pivoted at 55 on a suitable support 56 extending upwardly from the pipe line base 57. The other end of the lever 54 is provided with a roller 58 extending partly into the path of an elongated boat shaped cam 60 supported on the end of an arm 61 depending from the car bottom 40, this car cam 60 being preferably as long as the car and having a wedge shaped bow 62 and a similarly shaped stern 63.

The jet valve levers 54 are so located on adjacent sides of each pair of pipe lines that one car cam 60 serves to actuate two series of jet valve levers 54. As will be apparent, when each pipe line 24 is full of liquid under high pressure, the cam 60 will through means of the levers 54 hold open a group of jet nozzles 41 about equal in number to the number of buckets in each series, the bow 62 serving to continuously actuate a new jet valve lever while the stern 63 allows the levers 54, which the car has passed by, to be closed under action of the spring 48.

If intended for use with land planes, a shuttle 65 is provided, and operates through a slot 66 provided in runway 67 supported on a base 68. In this case the shuttle bottom 70 is provided with a plurality of series of buckets, nozzles, pipe lines and cam actuators substantially identical with that already described, and no further description is therefore necessary. The shuttle 65 has slippers 71 cooperating with tracks 72 for slidably supporting the shuttle 65, it being understood that in both this form and the form shown for the seaplane car 34, upper and lower wheels may be substituted for the upper and lower flanges of the slippers. The shuttle 65 tows the land plane 73 over the runway 67, the land plane 73 being supported on the runway by its own landing wheels 74, and being secured to the shuttle 65 by a loop on the end of a cable 75 extending over a hook 76 in the bottom of the fuselage so it will drop off the airplane when the airplane takes off upwardly from the shuttle. If the tail wheel is too narrow to straddle the opening 66 in the runway, a smaller carriage 77 may be provided therefor, and be attached to the shuttle 65 by a telescopic connecting rod 78.

In using the catapult, it is first desirable to have an airplane motor running at full speed before the car or shuttle commences to move down the tracks. A car or shuttle holding and releasing means may be provided, as shown in Figs. 9 and 10, and may consist of a bracket 80 secured to the end of the car or shuttle and provided with an eye 81 adapted to extend into a bifurcated eye 82 of a link 83, the link 83 being pivotally secured as at 84 to an anchor bracket 85. A shear pin 86 is dropped through the bifurcated eye 82 of the link 83 and the eye 81 of the car bracket 80. The shear pin 86 is of such strength that it will hold the car or shuttle against movement until a sufficient amount of power is applied to the car or shuttle, causing the pin to shear and allowing the car or shuttle to commence its motion.

To insure that the airplane will not leave the car or shuttle until it has reached a predetermined position at which flying speed presumably has been attained, suitable mechanism is provided for holding the aircraft to the car or shuttle and for releasing it when the desired position has been reached. The mechanism for holding a seaplane to the car 34 is shown in Figs. 11, 12 and 13. The back of the seaplane pontoon 37 is provided with an I-shaped fitting 87 extending between the jaws 88. These jaws 88 are held in closed position by a link 90 and a coil spring 91 anchored in a bracket 92 secured to the car 34.

Mounted on a base 93 depending from the car 34 is a bracket 94 on which is pivoted a bell crank 95 having its upper arm connected at 96 to the link 90 and having its lower crank arm 97 terminating in a roller 98. As will be apparent, clockwise movement of the bell crank 95, as viewed in Fig. 12, will cause the link 90 to open the jaws 88 and release the airplane fitting 87 therefrom. At a predetermined point along the runway or tracks there is provided a tripper 100 having a beveled approach 101 over which the roller 98 of the bell crank 95 will travel to move and hold the bell crank 95 to the airplane releasing position.

In the case of a land plane, the shuttle 65 has the land plane 73 releasably secured thereto by means of the mechanism shown in Figs. 14 to 17, inclusive. This mechanism includes a pair of airplane fittings 102 mounted on opposite sides thereof, preferably on its landing carriage. A base 103 on the bottom of shuttle 65 carries a bell crank lever 104 pivoted thereon which terminates at one end in a roller 98 for cooperating with the tripper 100 and beveled approach 101, as already described. The bell crank lever 104 is held in this position by a yieldable expansion coil spring 105 extending between the base 103 and the arm 106 of the bell crank lever 104. This arm 106 is provided with a link 107 through whose other end extends a pin 108 which cooperates with elongated slots 109 in the ends of the cross arms 110. At the other end of the cross arms 110, there is secured a shaft 111 extending upwardly through a bearing 112 in a bracket 113, the bracket 113 being secured to the corner of the shuttle 65. Secured to the top of the shaft 111 is the jaw arm 114 having a hooked end 115 cooperating with the hooked end 116 of the airplane fitting 102. As a result of the mechanism thus described, it will be apparent that when the roller 98 of the bell crank 106 is actuated by the tripper 100, the jaw arm 114 will be moved upwardly a sufficient amount to withdraw this hooked end 115 from cooperation with the hooked end 116 of the airplane fitting 102, releasing it and permitting the airplane to take off.

In operation, the pipe lines 24 are filled with fluid which is placed under pressure from compressors or steam generators 28, the valves 31 being suitably actuated to permit this to be done. The aircraft is placed in position on the car or shuttle or other mobile aircraft engaging means and the airplane motor is warmed up. When the airplane motor is fully warmed up, full power is turned on, causing the shear pin to break and allowing the car or shuttle to commence movement along its tracks. Immediately the car cam and actuator actuates the nearest jet valve levers, opening the valves in the jet nozzles and causing the jets to operate against the buckets, thus sending the car or shuttle down the tracks with its supported aircraft.

As above described, the additional power layouts 25 along the tracks may be at successively higher pressures, thus enabling greater speed to be more quickly attained. The tripper 100 is located at the position where the flying speed has been attained, tripping the aircraft release mechanism and allowing the aircraft to catapult into flight. Beyond this point the jet nozzles 41 extend in the reverse direction as diagrammatically shown at 141 in Figs. 1 and 2, whereby the jets coming therefrom strike the back or rear sides of the buckets of the now empty car or shuttle, bringing the car quickly to a stop. The car may then be returned back to the battery position, either by a temporarily attached cable or by permitting the braking jets to provide a reverse impulse sufficient to carry the car or shuttle back to its battery position.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

What is claimed is:

1. In an aircraft catapult apparatus having a launching runway and aircraft engaging mobile means mounted for movement on said launching runway, cooperative linear fluid turbine means on said aircraft engaging mobile means and in said runway, said cooperative fluid turbine means comprising a plurality of turbine buckets on said mobile means and a plurality of fluid jet nozzles extending linearly along said runway adjacent the path of said turbine buckets, releasing means on said aircraft engaging mobile means holding the aircraft thereto, means at a predetermined point along said runway to actuate said aircraft releasing means when said mobile means reaches said predetermined point, and means for decelerating said mobile means including a plurality of nozzles disposed in alignment at the end of the said plurality of fluid jet nozzles and being substantially reversely disposed to discharge against the rear sides of said turbine buckets.

2. In an aircraft catapult apparatus having a launching runway and aircraft engaging mobile means mounted for movement on said launching runway, cooperative linear fluid turbine means on said aircraft engaging mobile means and in said runway, said cooperative fluid turbine means comprising a plurality of turbine buckets on said mobile means and a plurality of fluid jet nozzles extending linearly along said runway adjacent the path of said turbine buckets, releasing means on said aircraft engaging mobile means holding the aircraft thereto, means at a predetermined point along said runway to actuate said aircraft releasing means when said mobile means reaches said predetermined point, and means for decelerating said mobile means including a plurality of nozzles disposed in alignment at the end of the said plurality of fluid jet nozzles and being substantially reversely disposed to discharge against the rear sides of said turbine buckets, said aircraft releasing means including an aircraft fitting on the aircraft, pivoted jaw means adapted to releasably engage said aircraft fitting, a link connected to said jaw means, and a bell crank connected to said link to operate said jaw means to released position, said actuating means comprising a tripper track having a beveled approach at said predetermined point along said runway to engage said bell crank and actuate the same.

3. In an aircraft catapult apparatus having a launching runway and aircraft engaging mobile means mounted for movement on said launching runway, a plurality of series of buckets secured to the bottom of said aircraft engaging mobile means and a corresponding plurality of series of fluid pressure jet nozzles mounted within said runway just below the paths of each series of buckets, and means for decelerating said mobile means including pluralities of nozzles disposed in alignment at the ends of each series of said plurality of series of jet nozzles and being substantially reversely disposed to discharge against the rear sides of said buckets.

4. In an aircraft catapult apparatus having a launching runway and aircraft engaging mobile means mounted for movement on said launching runway, a plurality of series of buckets secured to the bottom of said aircraft engaging mobile means and a corresponding plurality of series of fluid pressure jet nozzles mounted within said runway just below the paths of each series of buckets, and means for decelerating said mobile means including pluralities of nozzles disposed in alignment at the ends of each series of said plurality of series of jet nozzles and being substantially reversely disposed to discharge against the rear sides of said buckets, and elongated boat-shaped cam means carried by said aircraft engaging mobile means and disposed to successively actuate pluralities of said jet nozzles of each series during movement of said mobile means and only while said mobile means is in the immediate vicinity of corresponding pluralities of nozzles of said series of nozzles.

5. In an aircraft catapult apparatus having a launching runway and aircraft engaging mobile means mounted for movement on said launching runway, a plurality of series of buckets secured to the bottom of said aircraft engaging mobile means and a corresponding plurality of series of fluid pressure jet nozzles mounted within said runway just below the paths of each series of buckets, and means for decelerating said mobile means including pluralities of nozzles disposed in alignment at the ends of each series of said plurality of series of jet nozzles and being substantially reversely disposed to discharge against the rear sides of said buckets, each of said buckets being at a slight angle to the normal to the bottom of said aircraft engaging mobile means, each of said nozzles being at a slight angle to the horizontal, valve means comprising a stem extending into each jet nozzle, a spring normally holding the valve stem in closed position in the jet opening of the nozzle, a link connected to the end of said valve stem, a pivoted lever having one end connected to said link, and valve actuating means carried by said mobile means to engage the other end of said pivotal lever to actuate the valve and jet nozzle while the mobile means is in the immediate vicinity.

WILLIAM NELSON.

REFERENCES CITED

The following references are of record in the file of this patent:

UNITED STATES PATENTS

| Number | Name | Date |
|---|---|---|
| 425,408 | Craw | Apr. 15, 1890 |
| 465,151 | Barre | Dec. 15, 1891 |
| 553,622 | Lighthall | Jan. 28, 1896 |
| 1,483,992 | Sperry | Feb. 19, 1924 |
| 1,963,081 | Fellers | June 19, 1934 |

FOREIGN PATENTS

| Number | Country | Date |
|---|---|---|
| 470,767 | Great Britain | Aug. 20, 1937 |